United States Patent
Gupta et al.

(10) Patent No.: US 8,705,624 B2
(45) Date of Patent: Apr. 22, 2014

(54) PARALLEL DECODING FOR SCALABLE VIDEO CODING

(75) Inventors: Amit Gupta, Chandigarh (IN); Srijib Narayan Maiti, West Bengal (IN)

(73) Assignee: STMicroelectronics International N. V., Amsterdam (NL)

( * ) Notice: Subject to any disclaimer, the term of this patent is extended or adjusted under 35 U.S.C. 154(b) by 674 days.

(21) Appl. No.: 12/625,305

(22) Filed: Nov. 24, 2009

(65) Prior Publication Data

US 2011/0122944 A1    May 26, 2011

(51) Int. Cl.
*H04N 7/12* (2006.01)

(52) U.S. Cl.
USPC ..................................... 375/240.12

(58) Field of Classification Search
USPC ....................... 375/240.01, 240.12
IPC ..................................... H04N 7/12
See application file for complete search history.

(56) References Cited

U.S. PATENT DOCUMENTS

| | | | |
|---|---|---|---|
| 5,886,736 A * | 3/1999 | Chen | 348/43 |
| 2005/0259729 A1* | 11/2005 | Sun | 375/240.1 |
| 2008/0165848 A1 | 7/2008 | Ye et al. | |
| 2011/0286526 A1* | 11/2011 | Nakagami et al. | 375/240.16 |

OTHER PUBLICATIONS

IlHong Shin, et al.; Fast decoder for H.264 scalable video coding with selective up-sampling for spatial scalable video coding; Optical Engineering; Jul. 2008; pp. 070502-1-070502-3; vol. 47(7).

* cited by examiner

*Primary Examiner* — Dave Czekaj
*Assistant Examiner* — Tracy Li
(74) *Attorney, Agent, or Firm* — Hogan Lovells US LLP

(57) ABSTRACT

A method for decoding a stream encoded using a scalable video coding and including a plurality of layers of frames divided into a plurality of blocks, decodes block-wise in parallel the layers of the stream. A target block in an enhancement layer is decoded as soon as the block data required for its decoding are available from the reference layer.

20 Claims, 9 Drawing Sheets

PARALLEL DECODING FOR SCALABLE VIDEO CODING

FIELD OF THE INVENTION

The present invention relates to decoding of video data encoded by a scalable video coding. In particular, the present invention relates to parallelization of such a decoding.

DESCRIPTION OF THE RELATED ART

A majority of present applications related to providing video content rely on a fixed format of the video signal, given by the spatial and temporal resolution of the encoded video sequence. Lately, however, a large variety of diverse client devices have emerged such as set-top boxes, computers, portable digital assistants (PDAs) or mobile phones. These devices differ substantially in terms of achievable spatial and temporal resolution and available computational power. Thus the video streams suitable for these devices are necessarily different. In order to provide a video service adapted for diverse viewing devices and channel bandwidths, the video stream must be encoded many times with different settings. Each combination of settings must yield a stream that targets the bandwidth of the channel carrying the stream to the consumer as well as the decode capability of the viewing device. If the original uncompressed stream is not available, the encoded stream must be transcoded, which means that it has to be decoded and then re-encoded with the appropriate new settings. This rapidly becomes prohibitively expensive, and requires considerable time and computational power.

Scalable video coding (SVC) provides an alternative to such a multiple encoding and/or transcoding. In particular, scalable video coding provides an encoded video stream, the parts of which can be removed in such a way that the resulting substream forms another valid video stream for a decoder. The substream represents the same content as the complete video stream, however, with a lower reconstruction quality. Thus the video may be encoded only once with a high efficiency codec. The resulting video stream would, when decoded, yield the full resolution video. Furthermore, if a lower resolution or bandwidth stream is needed, for instance, in order to reach further into the network or to target a lower performance device, a small portion of the encoded stream may be sent without any additional processing. This smaller substream is easier to decode and yields lower resolution video. In this way, the encoded video stream is capable of adapting itself to both the bandwidth of the channel and to the capabilities of the target device.

In general, the term "scalable video coding" refers to a set of tools facilitating the features described above rather than to a single video coding mechanism. The concept of video scalability has been the scope of research and standardization over past at least twenty years. Most of video coding standards such as H.262/MPEG-2, H.263, or MPEG-4 include tools for supporting selected scalability features. Lately, the recent video coding standard H.264/MPEG-4 AVC has also introduced an extension including a broad choice of tools supporting scalable video coding.

H.264/MPEG-4 AVC is a video coding standard based on hybrid coding. A video signal input to an encoder is a sequence of images called frames, each frame being a two-dimensional matrix of pixels. Each individual video frame is subdivided into smaller blocks consisting of a plurality of pixels. Typically, a macroblock (usually denoting a block of 16×16 pixels) is the basic image element for which the encoding is performed. However, various particular encoding steps may be performed for smaller image elements, denoted sub-macroblocks or simply blocks and having the size of, for instance, 8×8, 4×4, 16×8, etc. Usually, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals or prediction error signal, is then calculated. Another encoding step is the transformation of a block of residuals from the spatial (pixel) domain into a frequency domain. The transformation aims at reducing the correlation of the input block. A further encoding step is quantization of the transform coefficients. In this step the actual lossy (irreversible) compression takes place. Usually, the compressed transform coefficient values are further losslessly compressed by means of an entropy coding. In addition, side information necessary for the reconstruction of the encoded video signal is encoded and provided together with the encoded video signal. This is, for example, information about the spatial and/or temporal prediction, amount of quantization, etc. The H.264/MPEG-4 AVC includes two functional layers, a Video Coding Layer (VCL) and a Network Abstraction Layer (NAL). The VCL provides the encoding functionality as briefly described above. The NAL encapsulates the encoded residuals together with the side information necessary for the decoding of video into standardized units, called NAL units, according to a prescribed syntax, and thus forms a bitstream of the encoded video signal.

FIG. 7 illustrates a simplified and generalized example decoder 700 compliant with the H.264/MPEG-4 AVC video coding standard. The bitstream comprising the encoded video data (input signal 701) and the side information elements which are necessary for decoding such as motion data, mode of prediction etc., are parsed in a parser according to the syntax rules defined by the standard and possibly stored in a buffer 710. The parsed data are then decoded by the entropy decoder 720. H.264/MPEG-4 AVC supports two kinds of entropy coding: a Context Adaptive Variable Length Code (CAVLC) or a Context Adaptive Binary Arithmetic Code (CABAC). The result of the parsing and entropy decoding is block data including texture information such as transformed and quantized residuals, and block side information such as prediction type or motion vectors. Quantized coefficients parsed from the bitstream and entropy-decoded 721 are fed to inverse quantizer 730 and inverse transformation unit 740, performing inverse discrete cosine transform (IDCT). After the inverse quantization and inverse transformation, a reconstructed prediction error signal 741 (residuals) is obtained. The reconstructed residuals 741 are then added to a prediction (reference) signal in order to reconstruct the image block. The reference signal is provided from either an intra prediction reconstruction unit 750 (inverse intra prediction) or from an inter prediction reconstruction unit 760 (inverse inter prediction). The intra prediction reconstruction unit 750 determines the reference signal from the already decoded blocks of the same image in accordance with the information about the type of the prediction parsed from the bitstream. The intra prediction reconstruction unit determines the reference signal according to the motion vectors parsed from the bitstream and according to a previous reference image stored in a Decoded Picture Buffer (DPB) 780. The reconstructed block is then filtered by a deblocking filter 770. The decoded and filtered image block 771 is output and/or stored in the decoded picture buffer 780 in case it is to be used as a reference (prediction) signal for the following frames.

The scalable video coding extension of H.264/MPEG-4 AVC supports the entire concept of the H.264/MPEG-4 AVC specification and, in addition provides various scalability tools. H.264/MPEG-4 AVC scalable video coding extension provides scalability temporally, spatially, and in terms of video quality. This means that it can yield decoded video at different frame rates, resolutions, or quality levels. In order to facilitate this, the scalable video coding extension has introduced a concept of layers. A base layer includes the lowest temporal, spatial and quality representation of the video stream. Enhancement layers encode additional information which, using the base layer as a starting point, can be employed to reconstruct higher quality, resolution, or temporal versions of the video during the decoding process. By decoding the base layer and a selected number of the subsequent enhancement layers required, a decoder can produce a video stream with certain desired characteristics.

Temporal scalability is provided in both H.264/MPEG-4 AVC and its SVC extension by means of hierarchical temporal prediction structure. Accordingly, the motion-compensated prediction is simply restricted to reference pictures with a temporal layer identifier smaller or equal to the temporal layer identifier of the picture to be predicted.

Spatial scalability in H.264/MPEG-4 SVC provides multiple layers, each spatial layer corresponding to a supported spatial resolution. In each spatial layer motion-compensated (inter) prediction or spatial (intra) prediction is employed in the same way as for the single layer encoding. However, in order to further improve coding efficiency, an additional inter-layer prediction mechanism is supported. The inter-layer prediction in H.264/MPEG-4 SVC includes i) inter-layer intra-prediction, which is prediction of reconstructed image signal of a layer based on reconstructed and upsampled image signal of a lower (reference) layer, ii) inter-layer motion prediction, which is prediction of macroblock modes and associated motion parameters of a layer from the corresponding information of a reference layer, and iii) inter-layer residual prediction, which is prediction of the residual (prediction error) signal of a layer from upsampled prediction error signal of a reference layer.

Quality scalability is a special case of spatial scalability with equal picture sizes of different layers, without upsampling. The refinement of higher enhancement layers is typically achieved by re-quantizing the residual signal in an enhancement layer with a smaller quantization step than the quantization step applied to the reference layer.

Further details on the H.264/MPEG-4 AVC and its scalable video coding extension are provided in Advanced Video Coding for Generic Audiovisual Services, ITU-T Rec. H.264 and ISO/IEC 14496-10 (MPEG-4 AVC), Version 8 and later, which is incorporated herein by reference.

In general, video codecs are used for compressing the video sequences in order to reduce the bandwidth required for transport of the encoded stream, or to reduce the storage space required to archive the encoded stream. However, sophisticated and bandwidth-efficient compression approaches are typically connected with increased computational requirements: the higher the compression ratio to be achieved, the more computational power is required. Fixing the tradeoff between bandwidth and computational requirements requires defining both the minimum channel bandwidth required for carrying the encoded stream and the minimum specification of the decoding device required to view the reconstructed stream. The computational requirements are especially critical due to a real-time nature of the video content and due to a possibly limited power and computational resources of the viewing devices.

The additional inter-layer dependencies introduced in the scalable video coding introduce additional delay in the decoding. As the decoding of each single layer is similar to a single layer decoding, a stream encoded by H.264/MPEG-4 SVC may be decoded by sequentially decoding each layer one by one. Such an arrangement is also termed as "multi-pass" since it passes multiple times through the same decoder. FIG. 8 illustrates such a multi-pass decoding for a simple case of a video stream including two layers, one base (reference) layer and one enhancement layer (spatially enhanced). The first part 801 of FIG. 8 schematically illustrates decoding of the base layer with a decoding system similar to that of FIG. 7, separated by a vertical line 890 from the second part 802 illustrating decoding of the enhancement layer by the same system later in time. The vertical separating line 890 indicates temporal separation of decoding the base layer from decoding the enhancement layer. The decoding of the two layers is similar to a typical H.264/MPEG-4 AVC decoding, but invoked two times sequentially once for each layer. The inter-layer prediction may further require introduction of processing blocks responsible for generation 810 of a virtual base layer (VBL) and for upsampling 830 of reconstructed signal as well as upsampling 820 of the residual signal. The virtual base layer serves for deriving a particular macroblock description 811 of the enhanced layer from that 721 of a reference layer.

As can be seen from FIG. 8, in order to decode a bitstream 851 including a frame of a target layer (the enhancement layer in this example) in this kind of multi-pass arrangement, we would first need to decode all the macroblocks of the reference layer frame, store the texture (both reconstructed pixels and residuals) as well as the macroblock related information and then start decoding the actual target layer. In order to facilitate this, an entire frame of the reference layer is upsampled twice, once for reconstructed image signal upsampling and once for the residuals. A scalable video coding decoder according to FIG. 8 handling L layers, would therefore have to be at least L times faster than a typical single-layer H.264/MPEG-4 AVC decoder (in the simplest case where there is no change of resolution between the reference layer and the enhanced layer). In addition, a rather large amount of storage buffers would be required for storing the whole frame of the reference layer, both image signal 831 (for inter-layer intra-prediction macroblocks) and residuals 821 (for inter-layer inter-encoded macroblocks). The main disadvantage of this decoding is increasing of processing requirements increasing with each additional layer supported by the scalable video coding, and the initial latency of decoding of at least one complete frame of reference layer. This kind of scalability is very difficult to achieve in practical embedded systems in terms of clock-frequency of operation.

The above disadvantages can be overcome partially by decoding a scalable video coding stream in parallel. FIG. 9 illustrates an example of such a parallel decoding for two layers, one base layer and one spatially enhanced target layer. The base layer is processed by a sub-system (similar to the system of FIG. 7) which is capable of decoding a standard H.264/MPEG-4 AVC video stream. The processing of the target layer is parallel to another sub-system, which is capable of decoding an enhancement layer of the scalable video coding stream. This subsystem comprises functional units similar and parallel to those of the base layer decoding subsystem such as an input buffer 710, an entropy decoder 920, inverse quantization 930, inverse transformation 940, intra and inter prediction units 950 and 960, respectively, decoded picture buffer 980 and deblocking filter 970. In general, a sub-system capable of decoding an enhancement layer of the SVC stream is also capable of decoding an H.264/MPEG-4 AVC bitstream. The main advantage of this parallel scheme 900 over the multi-pass system 801, 802 is that the processing capability in terms of frequency (clock) of operation of an existing H.264/MPEG-4 AVC system does not have to be increased essentially. The existing H.264/MPEG-4 AVC systems just need to be replicated and the additional computational block and buffers (such as upsampling units 820, 830 or virtual base layer 820) are to be introduced to take care of inter layer dependencies. Therefore, this solution is scalable more easily.

However, the decoding system 900 of FIG. 9 also introduces a latency of decoding of at least one complete frame of the reference layer since in order to decode an enhancement layer frame, a reference layer frame has to be already decoded. Extending such a parallel system to L layers results in an initial latency of L-1 layers. Initial latency is a critical issue for trick mode applications, e.g. fast-fordward, pause-play etc. Moreover, additional storage capacity is required for buffering the decoded information of reference layers necessary for decoding of (other) enhancement layers.

In order to reduce the complexity of spatial scalable video decoding, document IIHong Shin, Haechul Choi, et. al., "Fast decoder for H.264 scalable video coding with selective upsampling for spatial scalable video coding", Optical Engineering Letters, vol. 47(7), SPIE, July 2008 discloses a method according to which the upsampling is performed on a per-macroblock basis, only for intra macroblocks (I_BL) having the intra base layer mode of H.264/SVC. With such a method, the complexity of decoding may be somewhat reduced. However, the method does not provide any means for reducing the initial latency.

Some other methods have been developed to support operation of a scalable video encoding and decoding. For instance, document US 2008/0165848 A1 discloses a method for performing upsampling in a scalable video coding. In particular, the upsampling approach such as interpolation or nearest neighbor copying is selected adaptively in accordance with the location of the pixel to be interpolated. This approach aims at improving the quality of decoded pictures. However it does not relate to a parallel decoding and provides no means for essentially reducing the initial latency and the decoding complexity.

SUMMARY OF THE INVENTION

Given these problems with the existing technology, it would be advantageous to provide a system capable of parallel decoding of a video stream encoded by a scalable video encoding with a decreased latency.

It is the particular approach of the present invention to decode multiple layers of a video stream encoded with a scalable video coding in parallel by starting decoding of an enhancement layer of a frame before decoding all macroblocks of the reference layer of the frame, wherein the second layer requires data from the first layer for decoding.

In accordance with a first aspect of the present invention, a method is provided for parallel decoding of a stream of data including a video signal encoded with a scalable video coding and including a plurality of layers, the video signal including a plurality of frames divided into blocks. The method comprises decoding block data of a first layer required for decoding a target block in a second layer and providing the block data required for decoding of the target block to a second layer decoder. It further comprises decoding the target block in the second layer before having decoded all blocks of the first layer and based on said required block data.

In accordance with a second aspect of the present invention, a decoder is provided for parallel decoding of a stream of data including a video signal encoded with a scalable video coding and including a plurality of layers, the video signal including a plurality of frames divided into blocks. The decoder includes a first layer decoder for decoding block data of a first layer required for decoding a target block in a second layer and for providing the block data required for decoding of the target block to a second layer decoder, and a second layer decoder for decoding the target block in the second layer before having decoded all blocks of the first layer and based on said required block data.

In accordance with a third aspect of the present invention, a computer program product comprising a computer-readable medium having a computer-readable program code embodied thereon is provided, the program code being adapted to carry out the present invention.

In accordance with a fourth aspect of the present invention, a semiconductor chip is provided implementing the decoder of the present invention.

BRIEF DESCRIPTION OF THE DRAWINGS

The accompanying drawings are incorporated into and form a part of a specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein.

DETAILED DESCRIPTION OF PREFERRED EMBODIMENTS

Figure 1:
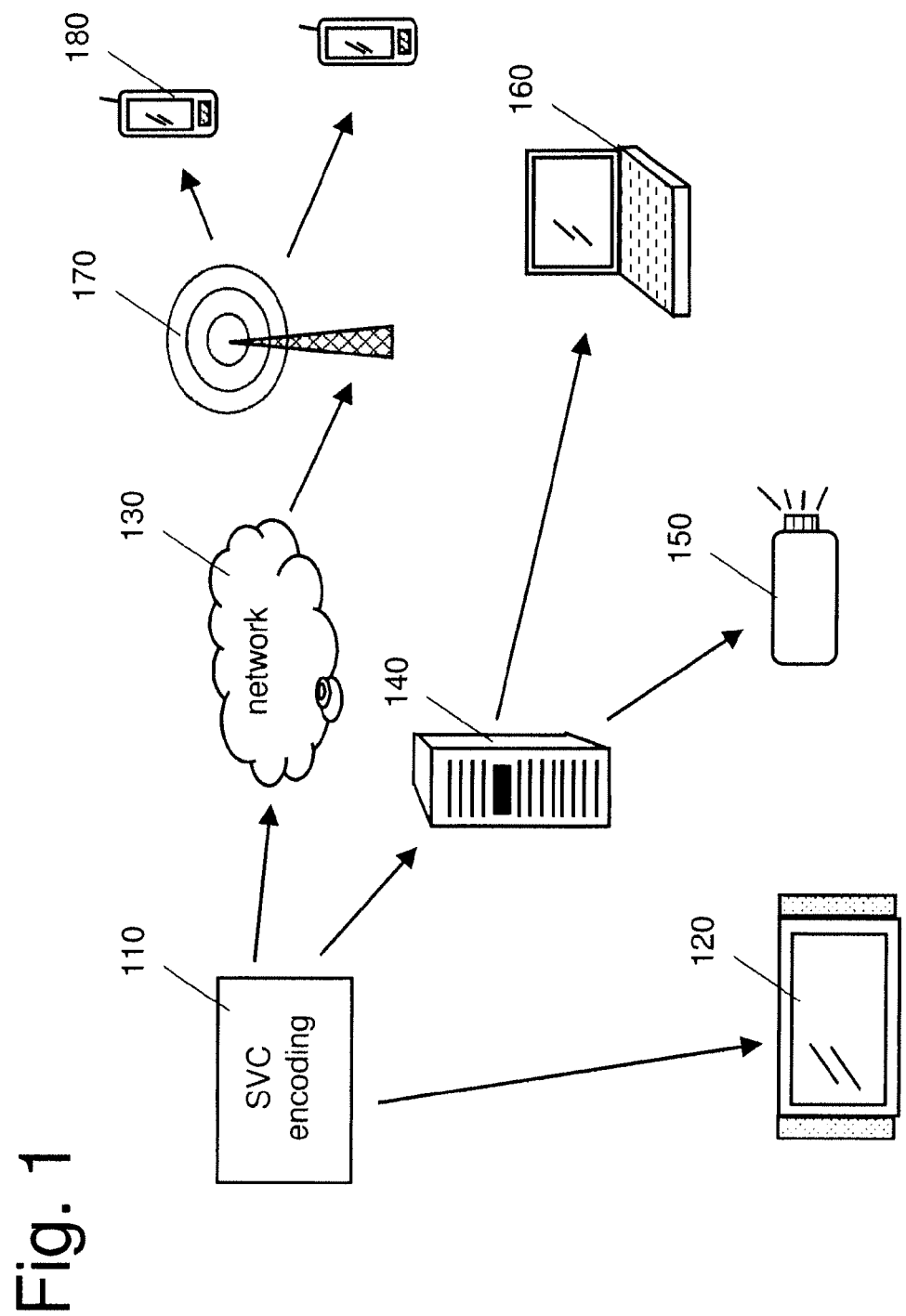
FIG. 1 is a schematic drawing illustrating a system in which the present invention may advantageously be employed.

FIG. 1 illustrates an example of a system in parts of which the present may be employed. The system of FIG. 1 includes examples of video content distribution over different links (channels) with possibly individual bandwidth limitations to various viewing devices with possibly different capabilities. A content provider 110 may provide a video stream encoded using a scalable video coding such as, for instance, the scalable video coding included as the extension in version 8 of H.264/MPEG-4 AVC standard. Such a video stream may comprise a plurality of different layers so as to provide different devices a possibility to decode only a part of the stream. The entire video stream may be transmitted, for instance, to a set-top box 120 and displayed in its full quality and spatial/temporal resolution. The same stream may be provided to a server 140 which may, for instance, remove some enhancement layers from the stream and transport the resulting modified stream over a channel with a bandwidth possibly lower than a bandwidth necessary for transmitting the entire stream. The modified stream may be transmitted, for instance to one or more personal computers 160 or projecting devices 150. The encoded scalable video stream may also be transmitted over a network 130 which may also include various servers and/or viewing devices capable of receiving or viewing only a part of the entire video stream. A network 130 may also be (or be connected to) a mobile network with access point(s) 170 serving mobile terminals 180. In order to adapt the transmission of the video stream to a possibly lower available bandwidth of a mobile/wireless system, the video stream may be processed in the network 130 or at the access point 170 by removing one or more enhancement layers in order to provide the mobile terminals 180 with a bandwidth-limited version of the video stream. Each of the example viewing devices such as 120, 130, 150, 160, or 180 may on its own decode the complete video stream as received (which may be the video stream generated by the content provider 110 or further reduced at a transit-device or in a network) or decode only a part of the stream, which means a selected number of layers. In this way, each device may adapt the decoding of the stream according to its own capabilities and/or status. The present invention may be advantageously applied to any viewing device (for instance, such as shown in FIG. 1) that decodes a video stream encoded by a scalable video coding and including more than one layer.

The present invention relates to a method and a device for parallel decoding of a video bitstream encoded by a scalable video coding. A stream encoded by a scalable video coding includes typically two or more subs-streams, each sub-stream comprising data of a particular layer. Parallelization of the decoding is provided at the sub-stream (layer) level. In particular, various scalable video coding layers may be decoded in parallel even if they are encoded utilizing inter-layer dependency. Such a parallelization at a sub-stream level may advantageously reduce the latency of decoding as well as decrease the memory requirements.

Figure 2:
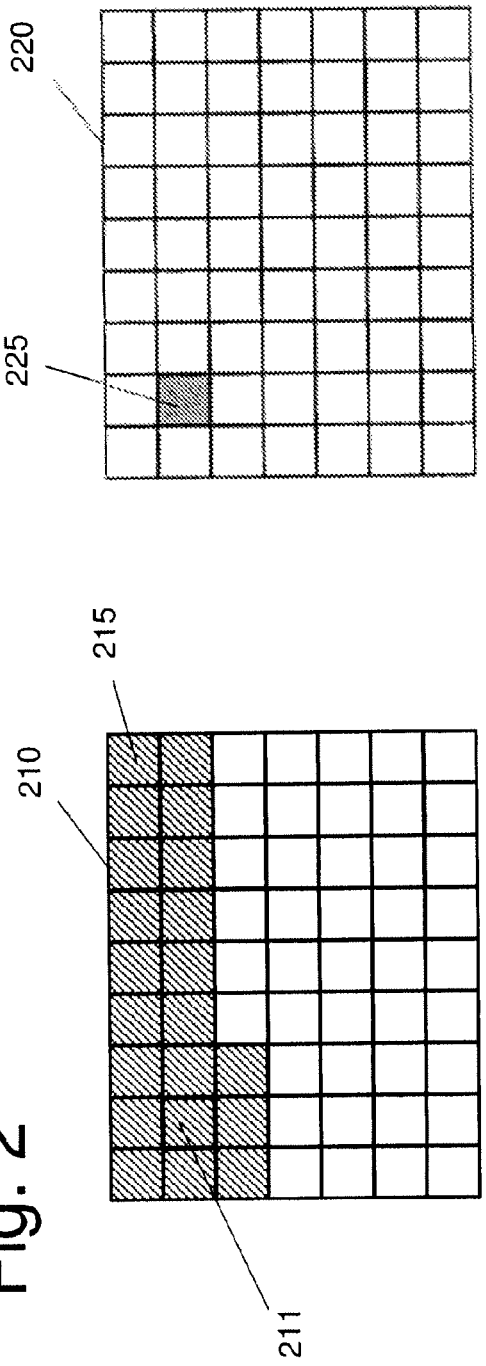
FIG. 2 is a schematic drawing illustrating decoding of a target block in an enhancement layer dependent on a reference layer.

FIG. 2 schematically illustrates a reference layer 210 subdivided into a plurality of macroblocks and an enhancement layer 220 also subdivided into a plurality of macroblocks. The reference layer 210 and the enhancement layer 220 are of the same frame of video signal. Macroblock 225 is a target block, which is to be decoded, in the enhancement layer 220. Macroblock 211 is a reference block, which is to be used for reconstructing of the target macroblock 225. The hatched region 215 in the reference layer 210 illustrates an example worst case for the macroblock data that have to be decoded. If the macroblock 225 is referred from the block 211 in the reference layer then the eight neighbouring macroblocks of the macroblock 211 might be required for successful decoding of macroblock 225 (for instance, some pixels of the neigbouring macroblocks may be utilized for upsampling pixels or residuals of the reference macroblock). When assuming a raster scanning of macroblocks during decoding, the hatched region 215 thus represents the macroblocks that should be decoded before decoding the target macroblock 225.

A method for parallel decoding of a video stream encoded with a scalable video coding, wherein the video stream includes at least two layers 210, 220 in which at least one block 225 is encoded by employing inter-layer prediction, comprises a step of decoding from a sub-stream including a first layer (reference layer) block data necessary for decoding of a target block 225 in a second layer (enhancement layer). As soon as this block data necessary for decoding of the second layer are decoded, the decoding of the target block may start. Starting of the decoding before all the blocks of the reference layer have been decoded enables reducing of the initial latency. The two layers 210 and 220 may be a base layer and an enhancement layer or two enhancement layers. The block data necessary for decoding of the target block may be, for instance, the reconstructed image pixels of the reference layers, or prediction error (residual) signal, or data related to type of prediction and motion information such as motion vectors. However, the present invention is not limited thereto and any block data that can be used for predicting block data of another layer may be employed instead. The requirement of a block data from a reference layer for decoding of another layer is typically indicated within the video stream encoded with the scalable video coding. Alternatively, such a requirement may be implicitly derived based on the received and already decoded data. Starting of the decoding of the target block as soon as the information required for its decoding is available enables a reduction of the initial decoding delay to less than one frame per layer.

In general, the decoded block information 215, possibly upsampled, may be made available by the reference layer decoder either by a direct pipelining it to the enhanced layer decoder or by writing the decoded block data into a memory buffer, to which the enhancer layer decoder has at least a reading access.

Figure 3:
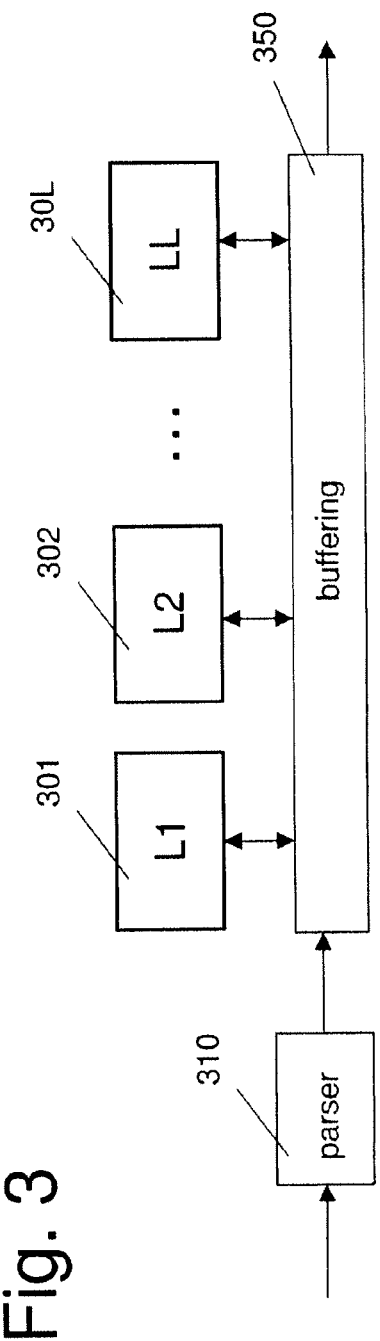
FIG. 3 is a block diagram illustrating sharing of data between sub-systems of a scalable video coding decoder.

FIG. 3 schematically illustrates how a plurality of subsystems 301, 302, ..., 30L for decoding L layers may exchange data by means of a buffer 350. The parser 310 extracts the image elements from the video stream to be decoded and stores the parsed data into the memory buffer 350. In the memory buffer 350, the parsed video data may be accessed by the particular layer decoding sub-systems 301, 302, ..., 30L. The base layer decoding sub-system 301 may start decoding immediately. As soon as it decodes the data required by the first enhancement layer for decoding of a portion such as a block and writes the required data into the buffer 350, the first enhanced layer decoding subsystem 302 may read the required data from the buffer 350 and start decoding the block. In the meanwhile, the base layer decoding sub-system 301 may continue decoding. Similarly, the second enhanced layer decoding subsystem 303 may start decoding as soon as data required for the decoding of a portion (such as block) of the second layer are available. The required data may be data from the first reference layer or data from the base layer depending on which of them is a reference layer for the decoding of the second layer. During the decoding of the second enhancement layer, the decoding of the base layer and the first enhancement layer may further continue. Similarly, this concept may be extended to decoding of L layers. In general, a decoding of an enhancement layer target block may start upon finishing the decoding of data in a layer serving as a reference required for decoding of the target block, the decoding including the providing of (an upsampled/rescaled) data over the buffer to the decoding sub-system of a dependent layer. In this way, a parallel processing in a plurality of the decoding subsystems is enabled and the initial latency is decreased to less than one frame per layer. Advantageously, a data sharing mechanism for sharing data between the layers of an SVC bitstream includes, apart from the buffering unit 350 a communication means, and the synchronization mechanism. In particular, the communication means are formed by the links interconnecting particular sub-system with the buffer 305. A synchronization mechanism is for controlling of the parallel decoding by means of, for instance, controlling the buffer access of the plurality of sub-systems. The data to be exchanged between two sub-systems due to their dependencies are advantageously shared at various synchronisation points. Such synchronization may be facilitated by a control unit (not explicitly shown in the figures) for controlling every sub-system. It should be noted that FIG. 3 only represents a schematic representation of an example of sharing the data between a plurality of sub-systems operating in parallel and processing inter-dependent data. In general, the buffer 350 may be formed by a plurality of separate buffers. For instance, the parser may provide the parsed video data to be decoded into another buffer than the buffer for interchanging the decoded data between the sub-systems.

Figure 7:
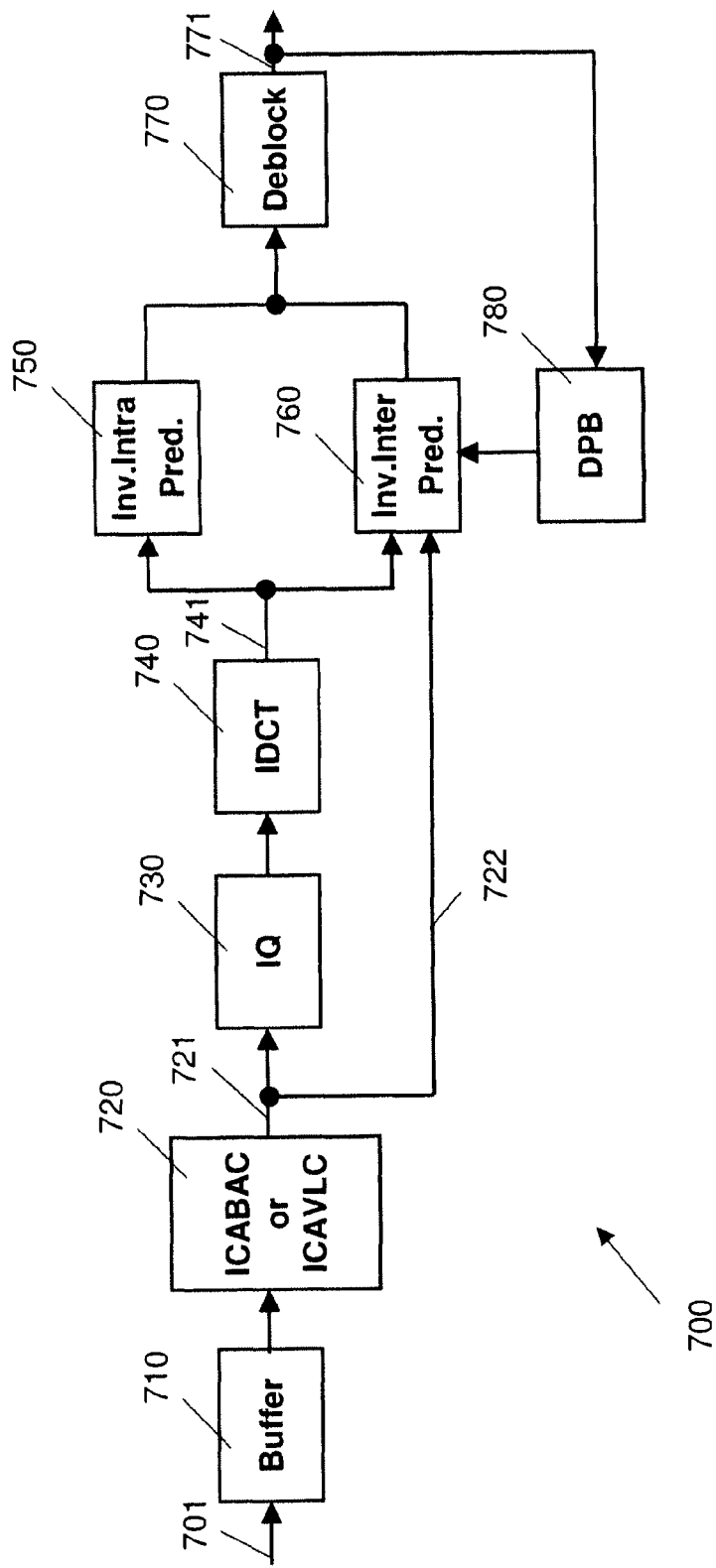
FIG. 7 is a block diagram illustrating an example of a single-layer prior art decoder.
Figure 8:
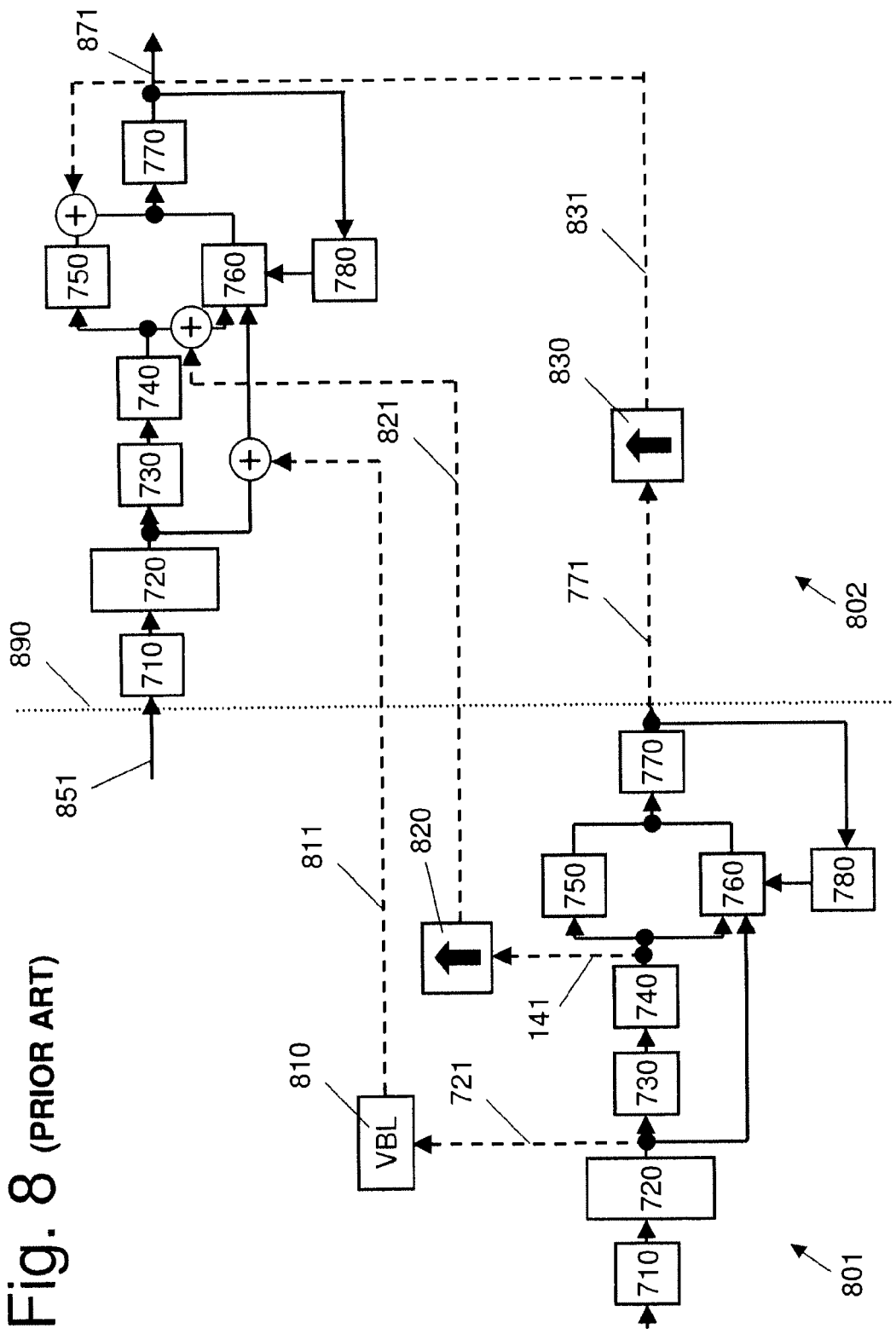
FIG. 8 is a block diagram illustrating an example of a prior art multi-pass multi-layer decoder.

A subsystem such as 301, 302, . . . 30L includes all functions necessary for decoding of a layer of a scalable video coding bits-stream. These functions may differ according to the particular coding applied. For instance, in the context of H.264/MPEG-4 SVC, the decoding may include steps as described with reference to FIG. 7. In particular, each sub-system may include parsing the coded data of a particular layer to the texture data and to the side information. The texture data comprises encoded image data. The side information comprises information necessary for decoding the image data such as prediction type, motion vectors, diverse flags for specifying the applied encoding, etc. The parsing may be performed together with the entropy decoding. In H.264/MPEG-4 AVC, entropy decoding (inverse coding) of either context adaptive binary arithmetic coding (inverse CABAC) or context adaptive variable length coding (inverse CAVLC) is applied. The image data may be further inverse quantized (IQ), and/or inverse transformed by an inverse discrete cosine transform (IDCT). Furthermore, prediction signal may be determined by means of an inter prediction or an intra prediction, and a deblocking filter may be applied.

In order to prepare the decoded data required for decoding of another layer, it may be necessary to upsample the data. The upsampling may be necessary either of the reconstructed image or of the prediction error signal (residuals). Furthermore, virtual base layer generation (VBL) may be generated in order to derive from the reference layer the block data required to decode the target block, the block data being related to motion estimation. Accordingly, motion vectors 811 are provided to the second layer decoding sub-system. Moreover, a type of prediction and partitioning for the motion estimation may be determined by a simple rescaling.

Figure 4:
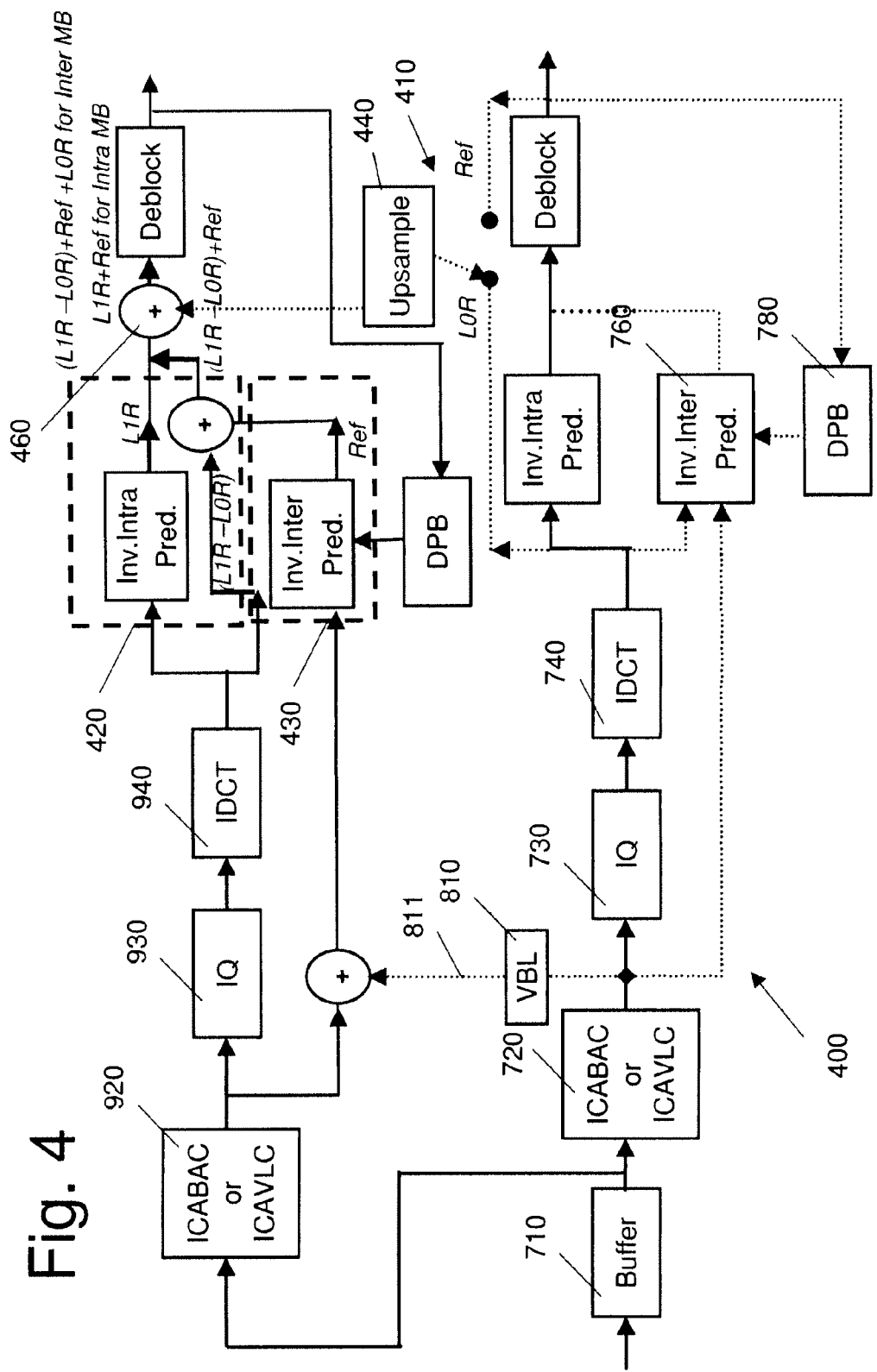
FIG. 4 is a block diagram illustrating functional blocks of an example scalable video coding decoder employing the present invention.
Figure 9:
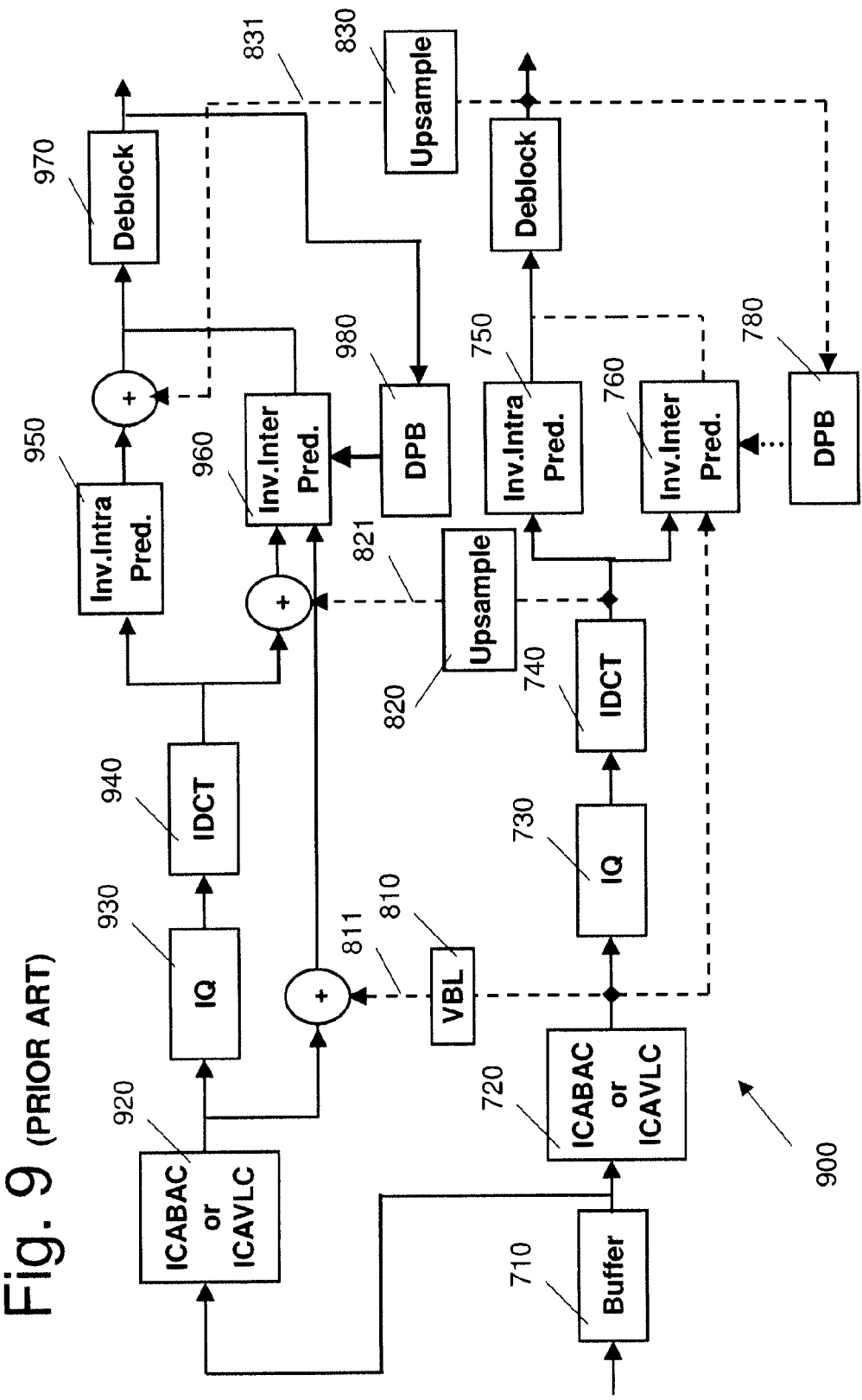
FIG. 9 is a block diagram illustrating an example of a prior art parallel multi-layer decoder.

FIG. 4 shows an example of implementation of the present invention within an H.264/MPEG-4 AVC environment. In comparison to the decoding system 900 of FIG. 9, there is only one upsampling unit 440 necessary. The upsampling unit 440 is modified to operate on one macroblock at a time, and to thus perform either an intra-upsampling or inter-upsampling for upsampling the reconstructed image block or the residual image block, respectively. The selection of the data to be upsampled is advantageously performed through a switch 410. The switch may be controlled in accordance with the side information included in the video bitstream and indicating whether for decoding of the target block a reconstructed image block and/or block of residuals from a reference layer are necessary. The upsampling is advantageously only performed, if it is required.

Figure 10:
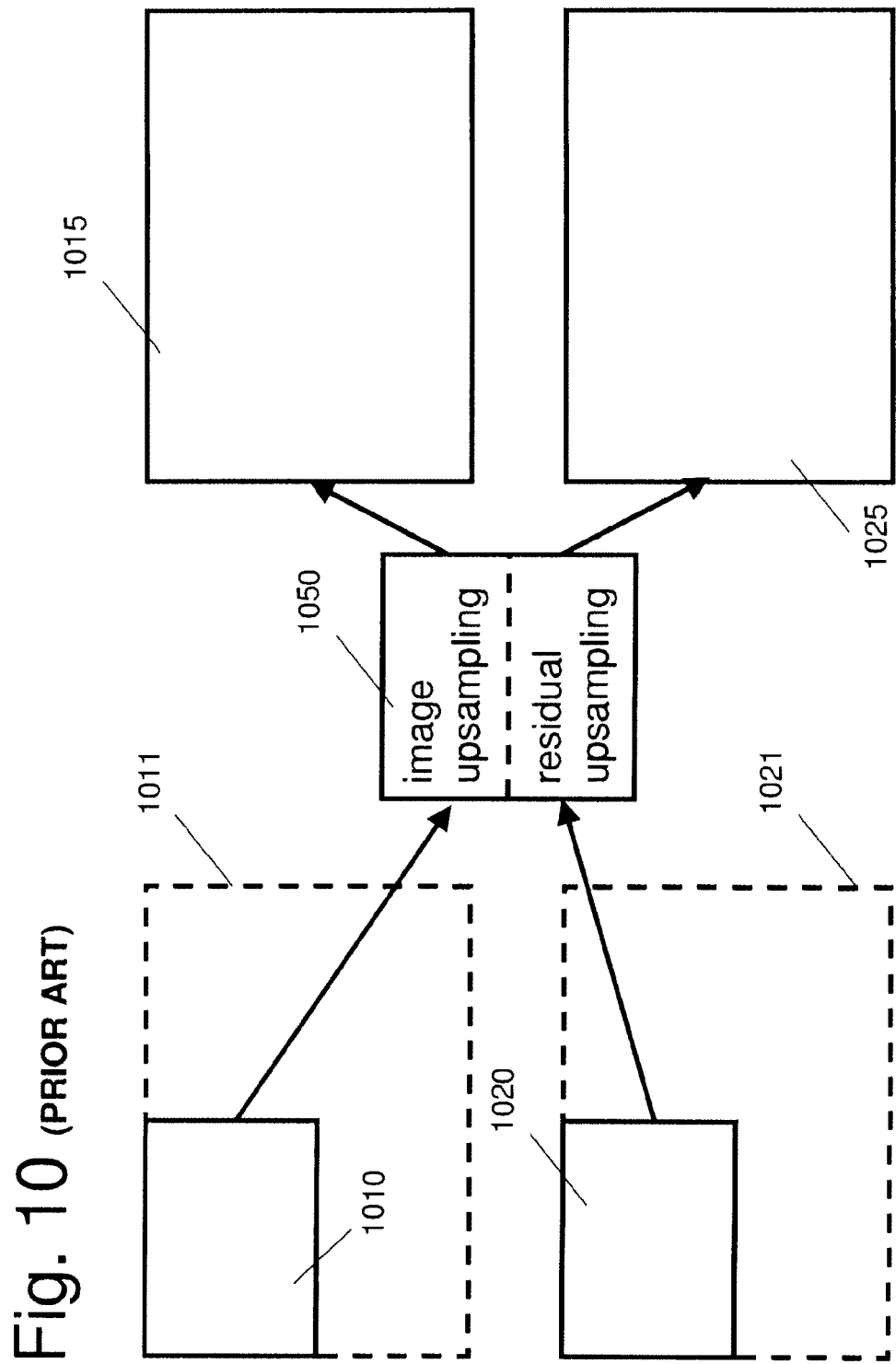
FIG. 10 is a schematic drawing illustrating an example of a prior art upsampling.

FIG. 10 illustrates upsampling 1050 typically performed in the prior-art, where the entire frame of reference layer (which may be the frame consisting of intra macroblocks or the frame consisting of inter macroblock) is upsampled twice, once for pixel upsampling 1010 and the other time for residual upsampling 1020, irrespective of whether these upsampled frames would be required by the enhanced layer or not. In this prior art example a reference layer frame 1010 and 1020 of resolution 176×144 (QCIF) is upsampled with a factor of two to generate upsampled frames 1015 and 1025 of resolution 352×288 (CIF).

Figure 5:
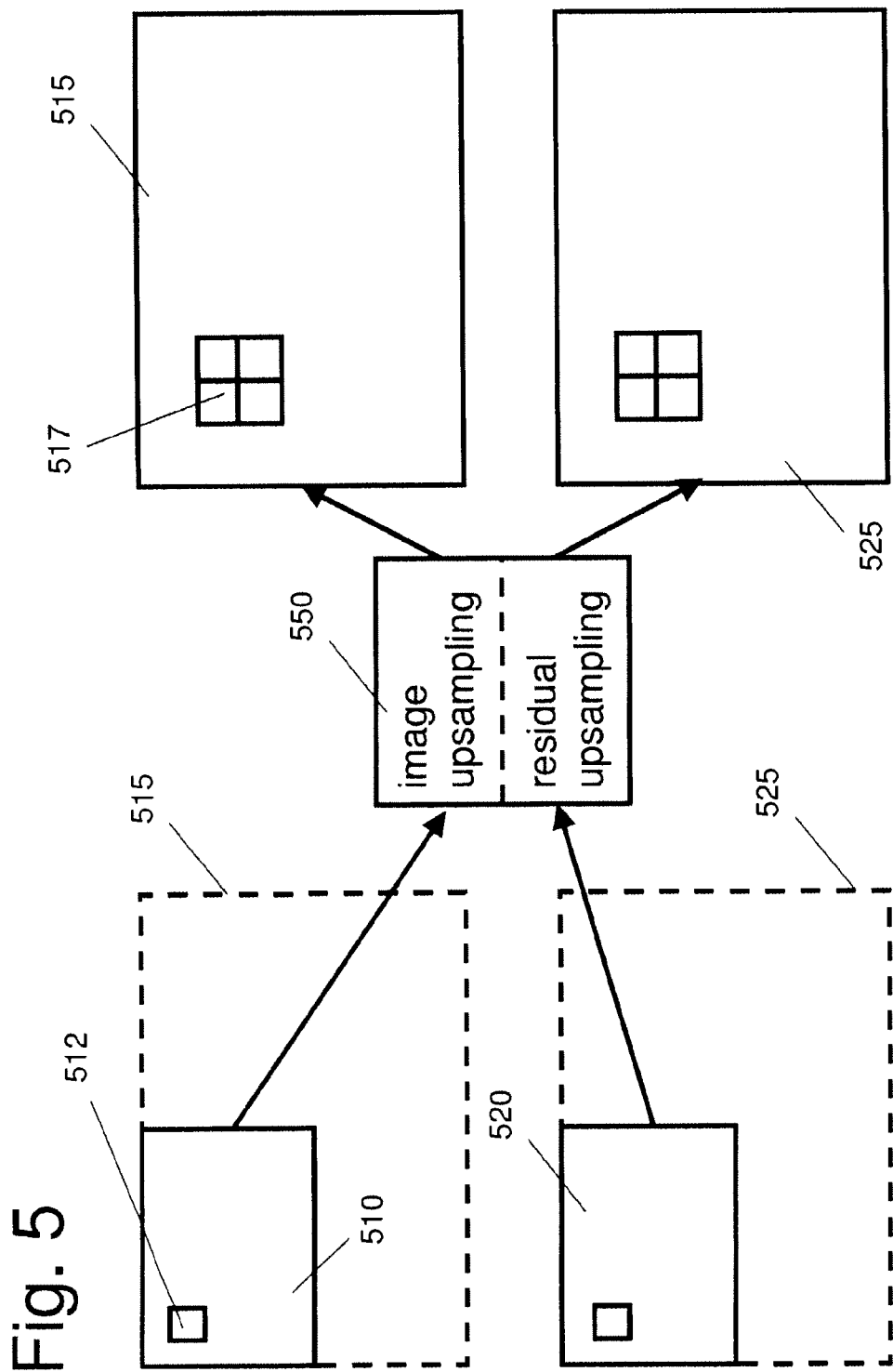
FIG. 5 is a schematic drawing illustrating an upsampling mechanism which may be advantageously applied for decoding according to present invention.

The modified upsampling is illustrated in FIG. 5. Accordingly, one upsampling process of either picture block or residual block is performed at a macroblock level only if the requirement is indicated in the bitstream. Thus, only macroblocks such as 512 needed for reconstruction of data of another layer are upsampled rather than the entire image. For instance, a macroblock 512 in the reference layer is upsampled to a macroblock 517. With such an upsampling, as shown in the example of FIG. 2, in the worst case, the decoding process of the enhanced layer bitstream can start as soon as all the eight neighboring macroblocks of the reference macroblock in the reference layer are decoded in the reference layer. This reduces the worst-case initial latency of decoding one complete frame of reference layer to twice (two rows have to be decoded if a raster scanning of macroblocks during decoding is assumed) the width of the reference frame in macroblocks plus three macroblocks (the bottom neighbours of the macroblock corresponding with the position to the target macroblock). FIGS. 5 and 10 refer both to a dyadic (by a factor of two) resolution ratio between the reference layer and enhanced layer. However, the present invention is not limited thereto any other ratios, integer or rational may be applied as well.

Decoding of the scalable video coding stream in parallel at the layer level provides another advantage of reducing the size of buffering means. For the decoding as described with reference to FIG. 9, two a rather large buffers of the size of a full frame of the reference layer were necessary, one buffer for storing the pixel information of intra-macroblock and the other buffer for storing the residuals of inter-macroblocks; and other two large buffers of the size of a full frame of the target layer were necessary, one buffer for storing the upsampled pixel information of reference layer intra-macroblocks and the other buffer for storing the upsampled residuals of the reference layer inter-macroblocks. With the above-described upsampling (cf. FIG. 5), these buffers are reduced to the size of approximately two rows of macroblocks of the reference layer and one macroblock for the enhanced layer. As a result, this decreases the memory footprint of the whole system, which becomes very critical in the typical embedded systems in terms of system cost, processing delay and power requirements.

Furthermore, the decoding of the prior art results in latency of decoding of L-1 number of layer frames before the decoding of the target layer (layer to be displayed in the final output) frame, where L is the number of layers in the SVC stream. The latency of the method described with reference to FIG. 4 is reduced to approximately two rows of MBs (in particular, 2*PicWidthInMBRef+3, where PicWidthInMBRef is the size of the reference layer picture width in terms of number of macroblocks) per reference layer included in the SVC stream.

FIG. 4 illustrates an intra prediction block 420 and an inter prediction block 430 of the enhancement layer decoder. From the reference layer decoder, either the reference block Ref including the reconstructed samples 771 is switched 410 to the upsampler 440 or a block of reference layer residuals L0R. The upsampler 440 provides an upsampled version thereof to a summer 460. The summer 460 combines for intra coded macroblocks the reference block Ref with the enhancement layer residuals L1R and provides the result L1R+Ref to the deblocking filter. The summer 460 sums up for inter coded macroblocks the reference layer residuals L0R with a result of enhancement layer inter prediction 430, namely (L1R−L0R)+Ref and provides the result (L1R−L0R)+Ref+L0R to the deblocking filter.

Figure 6:
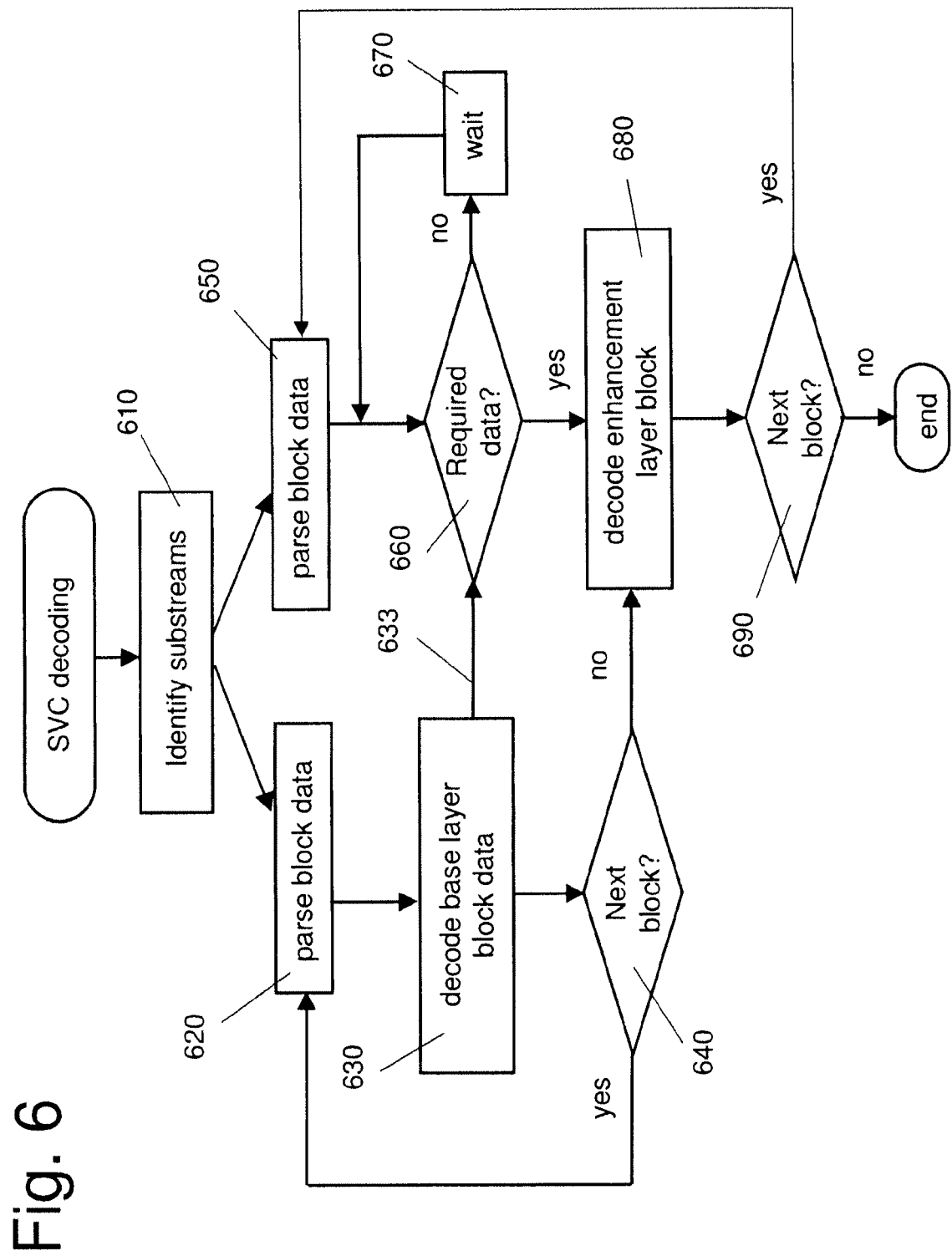
FIG. 6 is a flow diagram illustrating an example of a decoding method for parallel decoding of the scalable video coding stream.

FIG. 6 illustrates a flow diagram of an example of a method working in accordance with the present invention. The scalable video coding stream is typically segmented into a plurality of access units (AU), each access unit including a plurality of layers, the encoded layers corresponding to a plurality of encoded blocks of an image (frame). The video coding stream, in particular, within an access unit of the video coding stream the plurality of layers are identified 610 such as from the base layer to the target layer. The data of each layer are parsed. This example relates to two layers, to be decoded. However, the present invention is extensible to any number of layers. The data of a first layer are parsed in a parsing step 620 and the data of a second layer are parsed in a parsing step 650. These steps may be performed concurrently. The decoding of the second layer may start only if the data required for its decoding from the first layer are available. Thus, in case the required data are not available ("no" in step 660), it is waited until the possibly concurrent decoding 630 of the reference layer provides the required data 633. Upon availability of the required data ("yes" in step 660), a block of the enhancement layer may be decoded 680 and a data related to other block may be parsed 650 if there still are blocks to be decoded. The decoding of the blocks of the reference layer 630 may be performed concurrently and separately from the decoding of blocks of the enhancement layer. After the necessary data of the reference frame have been decoded, the decoding of enhancement layer blocks may be finished or decoding of a reference layer of a new access unit may be started.

The present invention is also applicable to decoding of more than two layers in parallel. In particular, the decoding of each enhancement layer may start block-wise as soon as the data of its reference layer required for decoding of a current block are available.

This enables, in a real time embedded environment, parallelization at the layer/sub-stream level, which allows reducing the initial latency of the decoding and requires smaller buffer capacity. Such a processing further reduces the processing delay, system cost, requirements of power by this reducing of the storage requirements.

In the prior art, the worst-case latency is L-1 number of frames, L being the number of frames, one per layer, in the SVC bitstream consisting of L layers in one access unit. The present invention may reduce this latency to at most (2*PicWidthInMBRef+3) number of macroblocks per reference layer, where PicWidthInMBRef is the number of macroblocks in one row of the frame in the reference layer.

Another embodiment of the invention relates to the implementation of the above described various embodiments using hardware and software. It is recognized that the various embodiments of the invention may be implemented or performed using computing devices (processors). A computing device or processor may for example be general-purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to an H.264/AVC/SVC based video coding system, and the terminology mainly relates to the H.264/AVC terminology. However, this terminology and the description of the various embodiments with respect to H.264/AVC/SVC based coding is not intended to limit the principles and ideas of the invention to such systems. Also the detailed explanations of the encoding and decoding in compliance with the H.264/AVC standard are intended to better understand the exemplary embodiments described herein and should not be understood as limiting the invention to the described specific implementations of processes and functions in the video coding. Nevertheless, the improvements proposed herein may be readily applied in the video coding described.

Summarizing, a method and a decoder is provided for parallel decoding of a stream of data including a video signal encoded with a scalable video coding and including a plurality of layers. a block data of a first layer required for decoding a target block in a second layer are decoded at first. Then after the required data of the first layer has been decoded, the target block in the second layer is decoded based on said block data.

We claim:

1. A method for parallel decoding an input stream of data including a video signal encoded with scalable video coding and including a plurality of layers, the video signal including a plurality of frames divided into blocks, the method comprising:
    decoding, with a first layer decoder, block data of a first layer to produce a virtual base layer and either of a decoded image block or a prediction error block in accordance with an indication within the input stream of data, wherein said decoded block data is required for decoding a target block in a second layer, and to provide the decoded block data that is required for decoding the target block to a second layer decoder;
    decoding, with the second layer decoder, the target block in the second layer based on said required block data provided by the first layer decoder before the first layer decoder has decoded all block data of the first layer;
    upsampling, using a single upsampler, either of the decoded image block or the prediction error block to produce upsampled data, and for providing the second layer decoder with the upsampled data; and
    switching as inputs to the upsampler either of the decoded image block or the prediction error block, the switching being in accordance with information within the input stream of data.

2. The method according to claim 1 wherein the decoding the target block starts as soon as said block data required for decoding the target block are decoded and provided to the second layer decoder.

3. The method according to claim 1 wherein decoding with the first layer decoder includes writing the decoded block data required for decoding the target block to a memory buffer, and decoding with the second layer decoder includes reading the decoded block data required for decoding of the target block from the memory buffer.

4. The method according to claim 3, further comprising:
synchronizing, with a control unit, the writing to and reading from the memory buffer.

5. The method according to claim 1, further comprising:
extracting, with a parser, from the input stream of data a first sub-stream including the first layer and a second sub-stream including the second layer; and
providing the extracted first sub-stream to the first decoder and the second sub-stream to the second decoder for parallel decoding.

6. The method according to claim 1, further comprising extracting, with a parser, from the input stream of data information indicating which data of the first layer are required for decoding the target block of the second layer.

7. The method according to claim 1 wherein the step of decoding the first layer and/or decoding the second layer further comprises:
decoding, with an entropy decoder, an encoded and transformed prediction error block related to an encoded image block from the block data of a particular layer,
inverse quantizing, with an inverse quantizer, the decoded transformed prediction error block,
inverse transforming, with an inverse transformation unit, the inverse quantized transformed prediction error block;
determining a prediction signal for the encoded image block with a spatial or a motion-compensated predictor; and
reconstructing the decoded image block based on the prediction error signal obtained after the inverse transformation and the prediction signal.

8. The method according to claim 7 wherein if the target block is a spatially predicted block, the upsampling of the decoded image block is performed and if the target block is a temporally predicted block, the upsampling of the prediction error block is performed.

9. The method according to claim 1 wherein the scalable video coding is compliant with H.264/MPEG-4 Scalable Video Coding standard.

10. A non-transitory computer readable medium having a computer readable program code embodied thereon, the program code to carry out the method according to claim 1.

11. A decoder for parallel decoding of an input stream of data including a video signal encoded with scalable video coding and including a plurality of layers, the video signal including a plurality of frames divided into blocks, the decoder comprising:
a first layer decoder for decoding block data of a first layer to produce a virtual base layer and either of a reconstructed image block or a prediction error block in accordance with an indication within the input stream of data, wherein the decoded block data is required for decoding a target block in a second layer, and to provide the decoded block data that is required for decoding the target block to a second layer decoder;
a second layer decoder capable of decoding the target block in the second layer based on said required block data provided by the first layer decoder before the first layer decoder has decoded all block data of the first layer;
a single upsampler for upsampling either of the reconstructed image block or the prediction error block to produce upsampled data, and for providing the second layer decoder with the upsampled data; and
a switch for switching as inputs to the upsampler either of the reconstructed image block or the prediction error block, the switching in accordance with information within the input stream of data.

12. The decoder according to claim 11 wherein the second layer decoder is capable of starting the decoding of the target block as soon as the block data required for decoding the target block are decoded and provided by the first layer decoder.

13. The decoder according to claim 11 wherein the first layer decoder is configured to write the decoded block data required for decoding the target block to a memory buffer, and the second layer decoder is configured to read the decoded block data required for decoding the target block from the memory buffer.

14. The decoder according to claim 13, further comprising a control unit for synchronizing the first layer decoder and the second layer decoder for the writing to and the reading from the memory buffer.

15. The decoder according to claim 11, further comprising a parser for extracting from the input stream of data a first sub-stream including the first layer and a second sub-stream including the second layer and for providing the extracted first sub-stream to the first layer decoder and the second sub-stream to the second layer decoder for parallel decoding.

16. The decoder according to claim 11, further comprising a parser for extracting from the input stream of data an information indicating which data of the first layer are required for decoding the target block of the second layer.

17. The decoder according to claim 11 wherein at least one of the first layer decoder and the second layer decoder further comprises:
an entropy decoder for decoding an encoded and transformed prediction error block related to an encoded image block from the block data of a particular layer,
an inverse quantizer for inverse quantizing the transformed prediction error block decoded by the entropy decoder,
an inverse transformation unit for inverse transforming the transformed prediction error block which was inverse quantized by the inverse quantizer;
a predictor for determining a spatial or temporal prediction signal for the image block which was inverse transformed by the inverse transformation unit; and
a reconstructor to produce the reconstructed image block based on the prediction error signal obtained from the inverse transformation unit and the prediction signal obtained from the predictor.

18. The decoder according to claim 11 wherein if the target block is a spatially predicted block, the switch inputs to the upsampler the reconstructed image block, and if the target block is a temporally predicted block, the switch inputs to the upsampler the prediction error block.

19. The decoder according to claim 11, compliant with H.264/MPEG-4 Scalable Video Coding standard.

20. A semiconductor chip implementing the decoder according to claim 11.

* * * * *

UNITED STATES PATENT AND TRADEMARK OFFICE
CERTIFICATE OF CORRECTION

PATENT NO. : 8,705,624 B2
APPLICATION NO. : 12/625305
DATED : April 22, 2014
INVENTOR(S) : Amit Gupta et al.

Page 1 of 1

It is certified that error appears in the above-identified patent and that said Letters Patent is hereby corrected as shown below:

In the Claims:

Column 14, line 31, delete "an"

Signed and Sealed this
Twelfth Day of August, 2014

Michelle K. Lee
*Deputy Director of the United States Patent and Trademark Office*